United States Patent [19]

Fiocchi

[11] Patent Number: 4,830,427
[45] Date of Patent: May 16, 1989

[54] VEHICLE COVER SUPPORTING SYSTEM

[76] Inventor: Jean B. Fiocchi, P.O. Box 520, South Glastonbury, Conn. 06073

[21] Appl. No.: 139,445

[22] Filed: Dec. 30, 1987

[51] Int. Cl.⁴ .............................................. B60J 11/00
[52] U.S. Cl. ...................................... 296/136; 24/515; 135/90
[58] Field of Search .................... 296/136; 135/88, 90; 52/3, 64; 24/513, 515, 516

[56] References Cited

U.S. PATENT DOCUMENTS

| | | | |
|---|---|---|---|
| 1,730,733 | 12/1926 | Judd | 135/88 |
| 1,759,628 | 1/1928 | Pellegrino | 135/90 |
| 1,801,247 | 6/1928 | Rush | 135/90 |
| 1,849,738 | 6/1931 | Amico | 135/90 |
| 2,679,254 | 5/1954 | Green | 135/90 X |
| 4,487,212 | 12/1984 | Moore | 135/90 |
| 4,489,466 | 12/1984 | Bakker | 24/516 X |

Primary Examiner—Johnny D. Cherry
Assistant Examiner—John M. Gruber
Attorney, Agent, or Firm—McCormick, Paulding & Huber

[57] ABSTRACT

A car cover has at least two supporting lines clamped to the four corners of the cover at the front and rear ends of the car. Additional clamping devices are slidable on these lines to provide additional support for the cover. Pulleys in the existing carport or garage superstructure provide access to both lines at one side of the vehicle so the cover can be manually hoisted to a stowed position clear of the car where it is ready for deployment onto the vehicle for periods of nonuse.

9 Claims, 2 Drawing Sheets

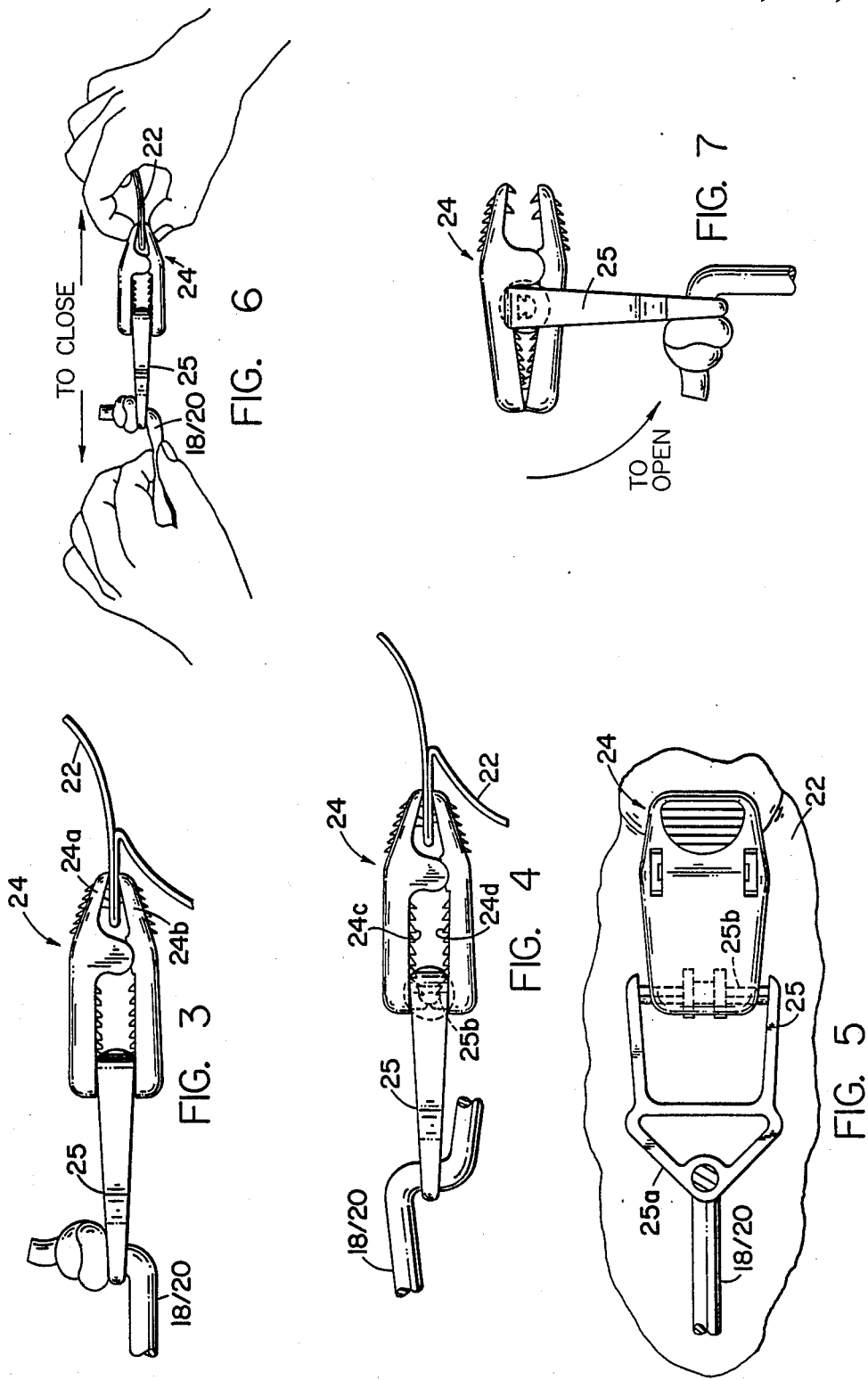

VEHICLE COVER SUPPORTING SYSTEM

This invention relates generally to supporting systems for vehicle covers and deals more particularly with a supporting system that is particularly suited for deploying a fabric car cover from a stowed position over the vehicle.

The general purpose of the present invention is to provide an improved assembly for handling a conventional car cover without requiring the car owner to fold up and roll out his car cover each time that he wants to uncover the vehicle for use or recover the vehicle after periods of use.

In accordance with the present invention a generally rectangular vehicle is covered with a fabric cover designed to fit the vehicle in terms of length, width and height, and the vehicle is preferably covered while under a carport or garage structure, providing a convenient superstructure above the vehicle for supporting laterally spaced pulleys. First and second lines are provided over these pulleys with opposed ends of the lines carrying clamping devices that serve to secure the ends of these lines to the four corners of the vehicle cover. A first line is connected to front corners of the vehicle cover and has an intermediate line portion that is available to be pulled for lifting the front portion of the cover off the vehicle and for securing the cover in a stowed position by attaching the intermediate line portion to a cleat or the like provided on the side wall or on a post in the superstructure itself. A second line is similarly secured to the two rear corners of the vehicle cover and passes over the same pulley assemblies and also has an intermediate portion that can serve the same purpose as the intermediate portion of the first line. Both intermediate line portions are tied together so the cover can be conveniently deployed or stowed.

Intermediate clamping devices are provided between the front and the midpoint of the vehicle cover with the line passing through these intermediate clamping devices in order to provide added points, and to achieve a folding action for the cover such that it will be stowed well out of the way of the vehicle.

BRIEF DESCRIPTION OF THE DRAWINGS

FIG. 3 is a detailed view of one end of one of the two lines used with the car cover of FIGS. 1 and 2, and also illustrates a clamping device for securing the end of the line to one of the four corners of the car cover.

FIG. 4 is a view of the same clamping device illustrated in FIG. 3 but showing the lines slidably received in the bail of the clamping device.

FIG. 5 is a plan view of the clamping device of FIG. 4.

FIG. 6 is a view of the FIG. 3 clamping device illustrating how such a clamping device can be closed.

FIG. 7 is a view of the clamping device of FIGS. 3, 4, 5 and 6 illustrating how the clamping device is opened to release the car cover.

DETAILED DESCRIPTION

Figure 2:
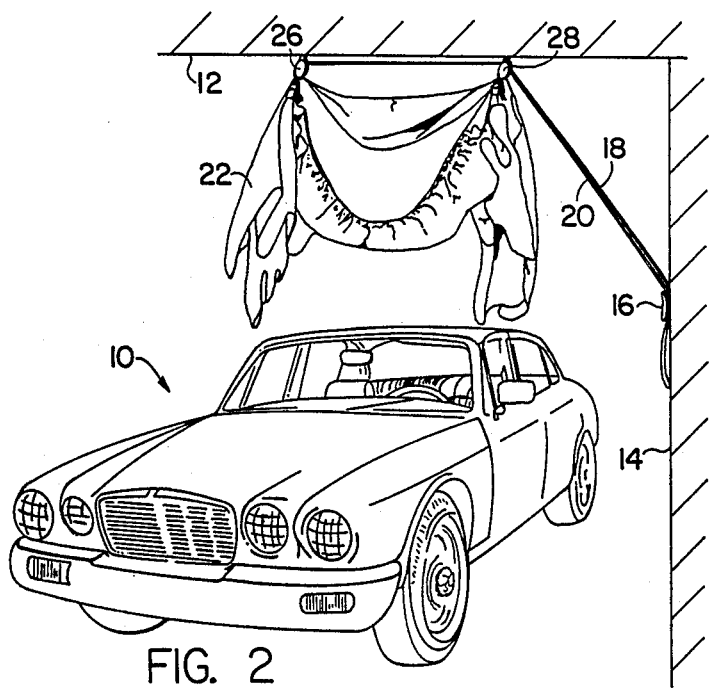
FIG. 2 is a view similar to FIG. 1 but illustrating the car cover in its stowed or hoisted position.

Turning now to the drawings in greater detail, and referring first to FIG. 2 a vehicle 10 to be covered is positioned below a beam 12 provided in a superstructure that may comprise a conventional garage, barn, or carport. A vertically extending wall or post 14 is preferably utilized to mount a cleat 16 of conventional configuration so that the lines 18 and 20 can be conveniently secured to the cleat 16 in order that the car cover 22 can be conveniently supported in the stowed position shown. The lines 18 and 20 have clamping devices as indicated generally at 24 in FIGS. 3–7 inclusively secured to the opposed ends of these lines 18 and 20 as suggested in FIG. 3.

Each such clamping device 24 includes jaws 24a, 24b which jaws are pivotally provided relative to one another and include portions that define ratchet teeth 24c and 24d. Each clamping device further includes a bail 25 that includes a portion 25a for receiving the line 18 or 20 and which bail 25 also includes a portion 25b opposite the line receiving portion 25a for engaging the teeth 24c, 24d as the clamping device is closed in the manner depicted generally in FIG. 6. This portion 25b of the bail 25 actually defines upwardly and downwardly projecting pawls that serve to engage the teeth 24c and 24d as a result of tensioning the clamping device as suggested in FIG. 6. Conversely, swinging the bail 25 to a 90 degree position relative the direction indicated in FIG. 6 will open the jaws as suggested in FIG. 7. Furthermore, moving the bail or swinging the bail from and to 45 degree positions to either side of the tensioning position of FIG. 6 will serve to ratchet the jaws into the clamped condition indicated for them in FIGS. 3 and 4 in the event that the simple tensioning maneuver illustrated in FIG. 6 fails to adequately anchor the clamping device to the cover 22.

Figure 1:
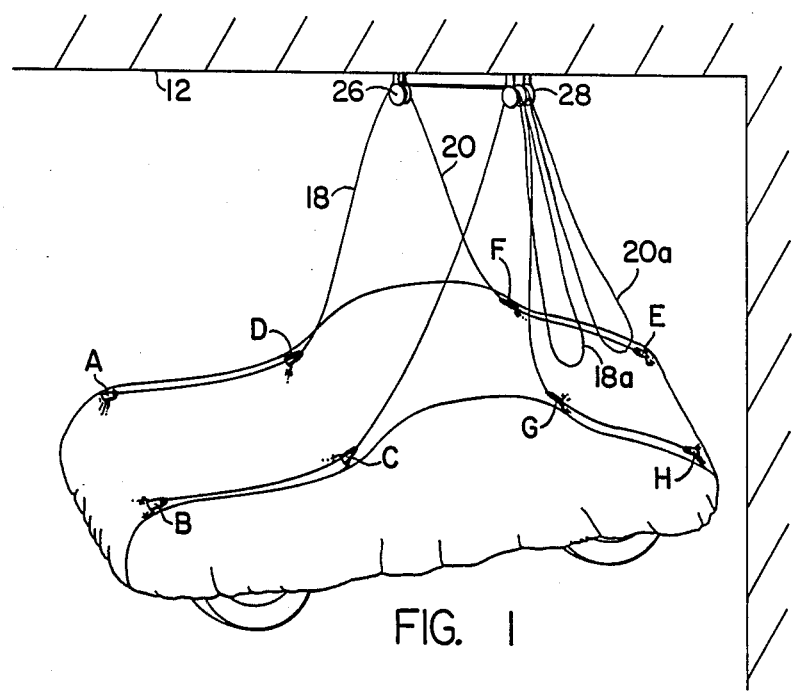
FIG. 1 is a perspective view of the car cover in its deployed position covering a vehicle.

As so constructed and arranged the clamping devices 24 provided at either end of the two lines 18 and 20 will permit the ends of these lines to be secured to the four corners of the car cover as suggested in FIG. 1 at the reference locations A, B, E, and H. The first line 18 preferably has its opposed ends secured by clamping devices 24 to the points A and B at the front left and right corners of the vehicle, whereas the second line 20 preferably has its opposed ends secured by means of the clamping devices 24 to the rear corners E and H of the vehicle. Line 18 raises the front half of the cover 22 and line 20 raises the rear half of the cover 22. Portions of these lines 18a and 20a are preferably tied together to faciliate raising the cover and also to facilitate lowering the cover as shown in FIGS. 1 and 2.

In further accordance with the present invention additional clamping devices are preferably provided at points intermediate the midpoint of the vehicle and the front and rear ends, and the lines 18 and 20 are slidably received in the clamping device bail at such points as referred to previously with reference to FIGS. 4 and 5. The clamping device of FIGS. 4 and 5 is clamped to the cover C in the same manner as the clamping device provided in association with the opposed ends of the lines 18 and 20. However, rather than securing the lines 18 and 20 to the bail 25 as suggested in FIG. 3 for these opposed ends the lines 18 and 20 are instead slidably received in the bail as suggested in FIGS. 4 and 5. Thus, line 18 for example passes through the bails associated with the clamping devices at locations C and D on the cover to provide an added point of support for the cover and to cause the cover to fold when it is moved from the deployed condition of FIG. 1 to the stowed condition of FIG. 2. Similarly, at points F and G generally midway between the midpoint of the vehicle and the rear end thereof additional clamping devices are provided on the cover and these devices slidably receive the line 20 associated with the rear part of the cover 22 so as to afford an added purchase on the cover and to facilitate deploying and lifting of the cover from and to the position shown for it in FIGS. 1 and 2.

Assuming that the vehicle owner has a conventional car cover 22 which is tailored to fit his vehicle and which protects the vehicle from the accumulation of dust and provides a degree of protection for the vehicle when it is parked in a typical garage where it might otherwise be susceptible to damage due to traffic, and due to the movement of objects into and out of the garage, the vehicle owner can more conveniently cover and uncover his vehicle by following the installation procedure in accordance with the following general instructions:

After locating the car in the garage a ceiling joist is selected approximately over the middle of the car. A cleat is provided on the wall or post nearest the car midpoint at a convenient height. After removing the car from the garage, line guiding and supporting devices in the form of pulleys are provided in the ceiling joist spaced apart from one another by a distance W corresponding to the width of the vehicle itself. One of these devices comprises a double sheave pulley and this pulley is installed closer to the cleat location so that both the first and second cover supporting lines can be passed through this double sheave pulley in order to permit removing and deploying of the cover from one side of the vehicle. Two lines are provided each of which is at least two and preferably three times the length of the car, one end of the line 18 is tied to the eyelet portion 25 of a clamping device 24 and the clamping device secured to the cover 22 adjacent the right front corner of the vehicle after which the line 18 is passed through an opening in another eyelet 25 associated with a second clamping device 24 as suggested in FIG. 4 so that this clamping device is adapted to be slidably received on the line 18. However this clamping device 24 is clamped to the cover 22 at the location D in FIG. 1. The line 18 is then passed over the single sheave pulley 26 provided in the superstructure or beam 12 at the right hand side of the vehicle as mentioned previously. The line 18 then passes over the double sheave pulley 28 with an intermediate portion of the line 18a providing a convenient purchase to hoist cover 22 as described previously.

The second line 20 is similarly secured to a clamping device 24 by tying the line to the eyelet and clamping the device 24 to the cover 22 at the corner E illustrated in FIG. 1 at the rear of the vehicle. The line then passes through an eyelet 25 associated with a clamping device 24 secured to the cover 22 at F with the line passing over the single sheave pulley 26 and through the double sheave pulley 28 so that an intermediate portion 20a of the line 20 is provided with the portion 18a of the first line 18. These lines 18 and 20 are similarly secured to the left hand front corner B and the left hand rear corner H of the vehicle respectively, with clamping devices 24 slidably provided on the lines 18 and 20 to permit attachment of these clamping devices to the vehicle cover as indicated generally C and G at FIG. 1. Both lines 18a and 20a in FIG. 1 are preferably tied together to facilitate raising and lowering the cover and securing these lines to the cleat.

To raise the cover from the vehicle one would first detach the cover, which will generally have a bungee cord or the like in its periphery, from the front and rear ends of the vehicle and more particularly to bring the cover up over the bumpers so that the intermediate portions 18a and 20a of the lines can be used to pull the cover up until all eight clamping devices are up to the pulleys or until the cover 22 is free of the vehicle roof. The lines are then cleated to the wall by the cleat 16 as shown in FIG. 2.

To lower the cover these lines can be released from the cleat and the cover lowered onto the car. One then simply pulls the cover ends back over the front and rear of the car to assure that the vehicle and its bumpers are completely covered by the tailored cover as shown in FIG. 1.

I claim:

1. The combination comprising a fabric cover shaped to fit over generally rectangular vehicle of length L, width W and height H, and with four corners, two corners at the front and two corners at the rear of the vehicle, a superstructure extending laterally across the midpoint of the vehicle, a first and a second line, each line having a length of at least twice the length of the vehicle, said first line having opposed ends, cover clamping devices secured to said opposed ends of said first line, line guiding and supporting devices secured to said superstructure, said clamping devices being releasably clamped to said cover adjacent two corners of the vehicle, said second line having opposed ends, cover clamping devices secured to said opposed ends of said second line, said clamping devices at said opposed ends of said second line releasably clamped to said cover adjacent two other corners of the vehicle, said first and second lines having intermediate portions guided and supported by said line guiding and supporting devices so that pulling said lines pulls said cover adjacent said two corners of the vehicle upwardly and generally into proximity with said line guiding and supporting devices and said two other corners of the cover to provide a stowed position of the cover that is clear of the vehicle but in condition for redeployment on the vehicle with minimal manual manipulation of the cover.

2. The combination of claim 1 further characterized by cover clamping devices slidably received on said first and second lines, certain of said devices slidable on said lines being releasably clamped to said cover intermediate the front of the vehicle and the vehicle midpoint, other of said devices slidably on said lines being releasably clamped to said cover intermediate the rear end of the vehicle and said vehicle midpoint.

3. The combination of claim 2 wherein said cover clamping devices comprises molded plastic grippers, each gripper including opposed pivotably mounted jaws, and each gripper further including a bail defining an eyelet portion for receiving said line and having a portion coupled to said jaws for opening and closing the jaws.

4. The combination of claim 1 wherein said line guiding and supporting devices comprise pulley assemblies secured to locations in said superstructure spaced laterally by the dimension W of the vehicle so as to be generally aligned with the left and right hand sides of the vehicle, and located generally midway of the longitudinal dimension L of the vehicle.

5. The combination of claim 4 wherein said first line has said clamping devices at its opposed ends clamped to said two front corners of the vehicle cover.

6. The combination of claim 5 wherein said second line has said clamping devices at its opposed ends clamped to said two rear corners of the vehicle cover.

7. The combination of claim 6 further characterized by cover clamping devices slidably received on first and second lines, certain of said devices slidable on said lines being clamped to said cover between the front of the vehicle and the vehicle midpoint, other of said devices slidably on said lines being clamped to said cover between the rear end of the vehicle and said vehicle midpoint.

8. The combination of claim 7 wherein said cover clamping devices comprises molded plastic grippers, each gripper including opposed pivotably mounted jaws, and each gripper further including a bail defining an eyelet portion for receiving said line and having a portion coupled to said jaws for opening and closing the jaws.

9. The combination of claim 8 wherein said bail cooperates with said jaws to define ratcheting means, said ratcheting means comprising upper and lower teeth defined in said jaws respectively, said bail defining pawls for engagement with said teeth.

* * * * *